United States Patent [19]

Smith et al.

[11] Patent Number: 4,738,336

[45] Date of Patent: Apr. 19, 1988

[54] CONTROLLED REPLENISHING LUBRICATION SYSTEM

[75] Inventors: Dennis W. Smith; Peter E. Jacobson, both of Phoenix, Ariz.

[73] Assignee: Honeywell, Inc., Minneapolis, Minn.

[21] Appl. No.: 43,062

[22] Filed: Apr. 27, 1987

[51] Int. Cl.$^4$ .......................................... F01M 11/12
[52] U.S. Cl. ...................... 184/6.4; 184/7.4; 184/108; 384/470
[58] Field of Search ................ 184/5, 5.1, 6.4, 7.4, 184/108; 384/399, 448, 462, 470, 624

[56] References Cited

U.S. PATENT DOCUMENTS

| | | | |
|---|---|---|---|
| 1,762,566 | 6/1930 | Wedeberg | 184/7.4 X |
| 2,545,719 | 3/1951 | Wedeberg | 184/7.4 X |
| 3,127,954 | 4/1964 | Callahan et al. | 184/7.4 |
| 3,561,565 | 2/1971 | Woor | 184/7.4 |

FOREIGN PATENT DOCUMENTS

| | | | |
|---|---|---|---|
| 217599 | 1/1985 | German Democratic Rep. | 384/448 |
| 5413853 | 2/1979 | Japan | 384/462 |
| 60-73124 | 4/1985 | Japan | 384/399 |

*Primary Examiner*—Carlton R. Croyle
*Assistant Examiner*—Theodore Olds
*Attorney, Agent, or Firm*—Howard Paul Terry

[57] ABSTRACT

A controlled replenishing lubrication system provides a desired supply of oil to a rolling element bearing by monitoring the changes in the rolling element ball retainer to shaft speed ratio. This ratio is a function of elastohydrodynamic oil film thickness between elements of the bearing. Changes in the speed ratio are monitored by a sensor and fed to a control system which commands a pump to inject oil into the bearing when the speed ratio varies from a predetermined limit. The rolling elements are moveably mounted for rotation within a retainer or cage in a bearing housing. The retainer includes a light reflective indicia. A shaft is rotatably connected to rotate the retainer and the rolling elements. The shaft also includes a light reflective indicia. The sensor is mounted on or adjacent the bearing for simultaneously emitting light toward the retainer and shaft indicia for sensing variations in reflection of the light therefrom and for generating pulses to the control system responsive to the variations. The pump then responds to commands from the control system for providing a desired amount of lubricant to the bearing.

19 Claims, 4 Drawing Sheets

CONTROLLED REPLENISHING LUBRICATION SYSTEM

BACKGROUND OF THE INVENTION

1. Field of the Invention

This invention relates generally to lubrication systems and more particularly to replenishing lubricating oil to a rolling element bearing in response to sensing a reduction in elastohydrohynamic film thickness.

2. Description of the Prior Art

In lubrication systems it is often desirable to maintain minimum drag torque and consistant performance over long periods of time. Increases in life requirements for lubricated parts have motivated the search for a lubrication system that would provide a desired amount of lubricating medium over a long period of time. In bearings, it is critical to provide a substantially exact amount of oil between the frictional surfaces since excessive oil has been shown to cause high drag torques due to excessive viscous drag, reduced stability of the rolling element retainer (the cage) and increased emitted vibration. Insufficient oil produces a thinner elastohydrodynamic film which leads to higher friction, increased wear and, consequently, premature bearing failure. Three basic lubrication systems which are well known include the oil film system, the controlled leak system and the grease system.

The oil film system supplies a light film of oil, in a fixed amount, applied to the surfaces of a bearing prior to being placed in operation. This system is simple, has moderately low drag torque but has limited life expectancy due to the inherently limiited useful life of a lubricant. Since only a small amount of oil is used to minimize viscous drag, and since there is a gradual loss of oil due to evaporation, migration and chemical decomposition, the system has an unacceptably short life. If an attempt is made to increase the life by increasing the amount of oil initially, the result will be higher viscous drag torque.

The controlled leak system is an attempt to maintain a constant amount of oil in an operating system, i.e. replenish lost lubricant. A reservoir is placed outside of the bearing. There is a device between the reservoir and the bearing that is designed to provide a slow constant leakage rate of oil from the reservoir into the bearing. This leakage rate is intended to match the amount of oil being lost in the bearing, thus endeavoring to maintain the quantity of lubricant constant throughout the life of the bearing. When operated correctly, this system provides moderately low drag torque and extended life in comparison to the above-described oil film system. Limitations of the controlled leak system include increased complexity and high sensitivity to environmental and manufacturing tolerances which may cause positive or negative extremes in lubricant feed rate resulting in either starving or flooding the bearing.

The grease system is relatively simple, has considerably longer life than the oil film system and maintains a more consistent film thickness than the controlled leak system. Some limitations of the grease system include increased drag torque, greater difficulty of analysis, and adverse effects on cage stability near the end of the useful life of the lubricant. Grease systems, particularly those using channeling type greases, have provided low drag torque and reasonably long life expectancies.

The foregoing illustrates limitations known to exist in present devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a controlled replenishing lubrication system that provides a desired supply of oil which includes a bearing housing having rolling elements movably mounted for rotation with a retainer or cage in the housing. The retainer includes a light reflective indicia. A shaft is rotatably connected to rotate the retainer and the rolling elements. The shaft also includes a light reflective indicia. Means are mounted adjacent to the housing for simultaneously emitting light towards both indicia for sensing variations in reflection of the light and for generating pulses responsive to the variations thereby monitoring changes in rolling element ball retainer to shaft speed ratio. When the ratio exceeds a predetermined limit, a control system is responsive to the variations and controls a pump connected to the bearing to provide a desired supply of lubricant thereto.

The foregoing and other aspects will become apparent from the following detailed description of the invention when considered in conjunction with the accompanying drawing. It is to be expressly understood, however, that the drawing is not intended as a definition of the invention but is for the purpose of illustration only.

DESCRIPTION OF THE PREFERRED EMBODIMENT

Figure 1:
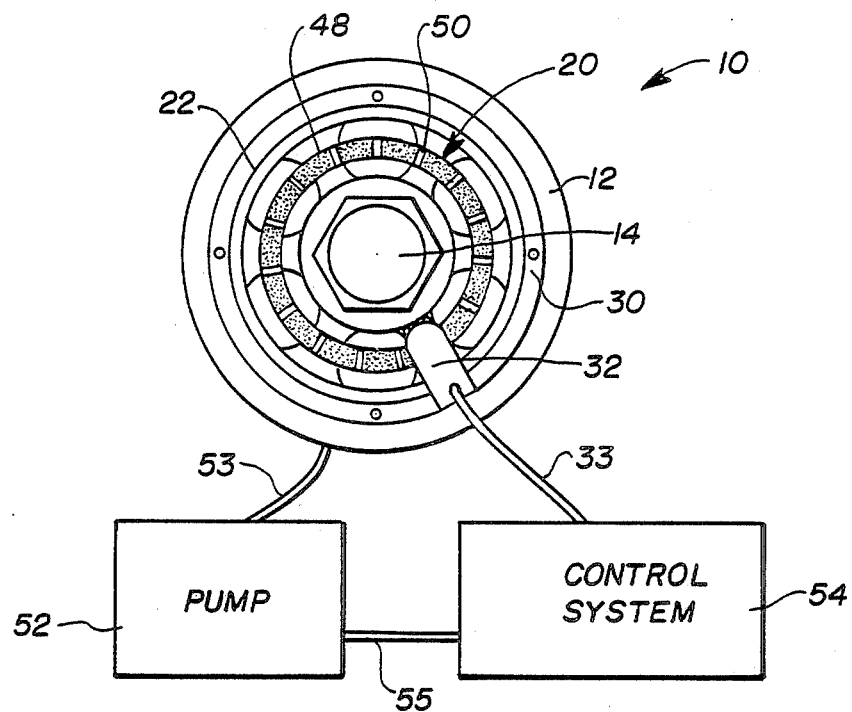
FIG. 1 is a diagrammatic view illustrating an embodiment of the lubrication system of this invention.
Figure 2:
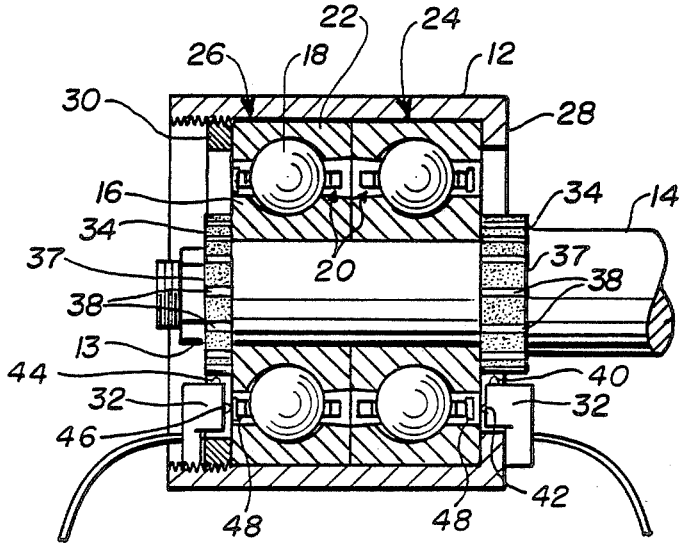
FIG. 2 is a cross-sectional view of the bearing of FIG. 1 fitted with a photovoltaic speed ratio sensor (shown more clearly in FIG. 3), wherein like elements have like reference numerals.

A controlled replenishing lubrication system illustrated in FIGS. 1 and 2 is generally designated 10 and includes a bearing cartridge or housing 12. In FIG. 2, a double row bearing is illustrated within housing 12. A first bearing set 24 and a second bearing set 26 have an externally driven shaft 14 extending therethrough. Since bearing sets 24, 26 are similar, only one will be described in detail. Shaft 14 extends through housing 12 and is secured at 13 to rotatably drive an inner race 16. A plurality of rolling elements, such as ball 18, are set within a movable retainer or cage 20 which rotates with ball 18 in a raceway defined between the inner rotating race 16 and an outer stationary race 22. Bearing sets 24, 26 are secured in side-by-side relationship within housing 12 between a flange 28 and a retainer ring 30.

Figure 3:
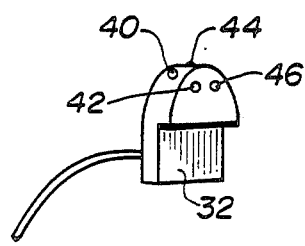
FIG. 3 is a perspective view illustrating an embodiment of a photovoltaic speed ratio sensor used with this invention.

Sensing means such as a sensor 32, shown in FIGS. 1, 2 and 3, may be mounted adjacent or on housing 12. Each bearing set 24, 26 has a reflective ring 34 circumferentially mounted to rotate with shaft 14. Each ring 34 includes a dark, non-reflective surface 37 having a plurality of equally spaced light reflective stripes 38 forming an idicia thereon. Stripes 38 extend substantially parallel with the longitudinal axis of shaft 14. The retainer or cage 20 shown in FIGS. 1 and 2, of each bearing set 24, 26 similarly has a non-reflective surface 48 having a plurality of light reflective stripes 50 forming an indicia thereon which extend radially with respect to shaft 14, which is mounted on the end of the cage 20 and cooperative with the sensor 32.

Sensor 32 is preferably a photo voltaic sensor and includes a pair of galium-arsenide, infra-red emitting diodes 40, 42 and two corresponding photodarlington sensors 44, 46. The photodiode 40 is aimed at the circumference of the ring 34 while the photodiode 42 is aimed at the surface 48 on cage 20. Indicia in the form of stripes 38 and surface 37 of ring 34 produce variations in the reflection of light emitted from diode 40 as a function of the rotation of the shaft 14. Stripes 50 and surface 48 of cage 20 also produce variations in the reflections of light emitted from diode 42 as a function of the rotation of the cage 20. One photo sensor 44 is aimed at ring 34 while the photo sensor 46 is aimed at the cage 20. The variations in reflected light are sensed by photo sensors 44, 46. A resulting pulse is produced in response to these variations in reflection of the emitted light. This produces a fluctuating wave output from photo sensor 46 the frequency of which is proportional to cage speed.

Pump means 52 is connected at conduit 53 for pumping a suitable lubricant to bearings 24 and 26 in response to speed variations between shaft 14 and cage 20 as sensed by sensor 32. This is accomplished through a control means 54 coupled to sensor 32 at lead 33 and also connected to pump means 54 coupled to sensor 32 at lead 33 and also connected to pump means 52 at connection 55. In this manner, pump means 52 is coupled to respond to commands from control means 54.

For a more complete understanding of the present invention, it should be recognized that in an operating bearing, a lubricant film is generated between the rolling elements and the raceways. As the elastohydrohynamic (EHD) film thickness increases, the contact angle decreases which in turn causes a decrease in the ball set or cage speed relative to the shaft speed. If the rotational speeds of the cage and the shaft are monitored simultaneously, a ratio of speed between the cage and the shaft can be obtained. This ratio decreases as the EHD film in the bearing increases. Consequently a transducer that senses the changes in EHD film thickness variations between the ball and the raceway is fundamental to the invention. There are a number of techniques for sensing the shaft speed and the cage speed utilizing for example: magnetic pickoffs; reluctance pickoffs; RF pickoffs; photoelectric sensors; Hall effect sensors; and ultrasonic sensors. However, the preferred sensor 32 is illustrated and described above.

In general, the way the control system works is to measure the cage/shaft speed ratio during a certain period of time, that is defined by a specific number of shaft pulses. The speed ratio is then compared to a limit which has been predetermined. A decrease in EHD film thickness causes an increase in the cage/shaft speed ratio. Every time the ratio exceeds the input limit a pulse is generated and counted. When a specified number of these pulses have been counted within a predetermined time segment, an output pulse is generated to actuate an oil injection pump relay.

The control system might also be configured to examine the rate of change of the ratio or the variability of the ratios as well. Additionally, other control law variations will become obvious to those skilled in the art.

Figure 4:
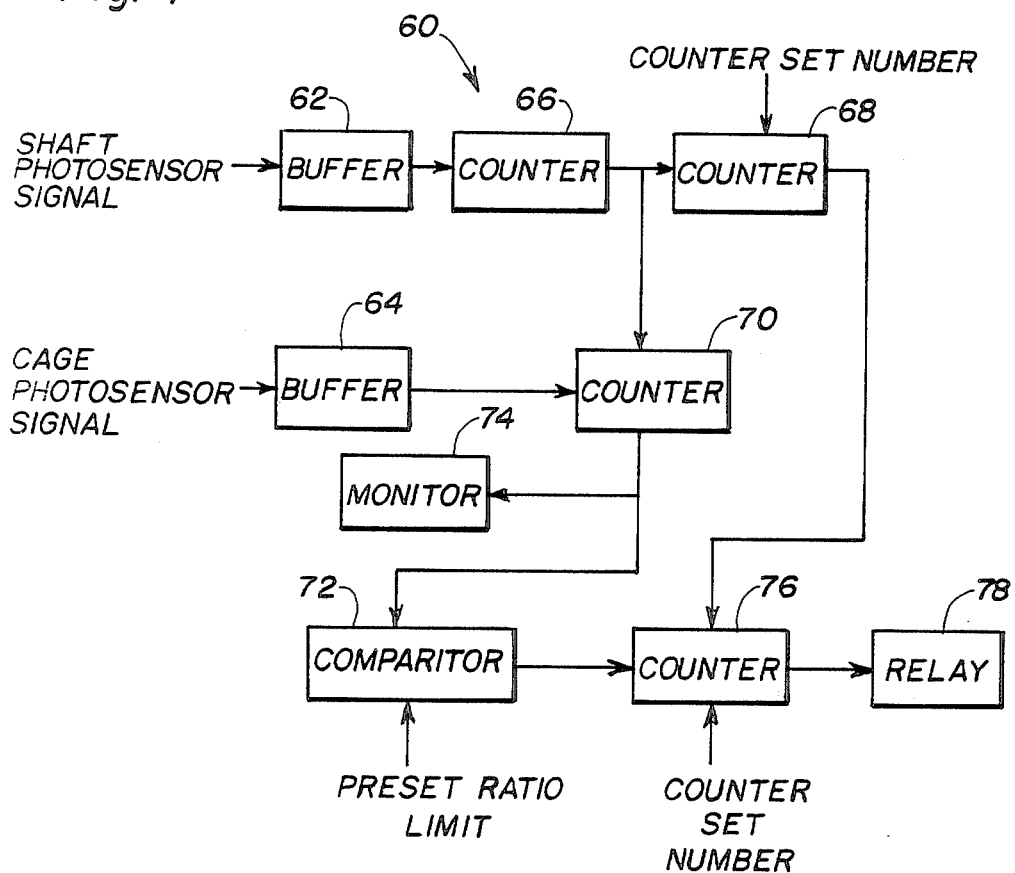
FIG. 4 is a diagrammatic view illustrating an embodiment of a control system used with this invention.
Figure 5:
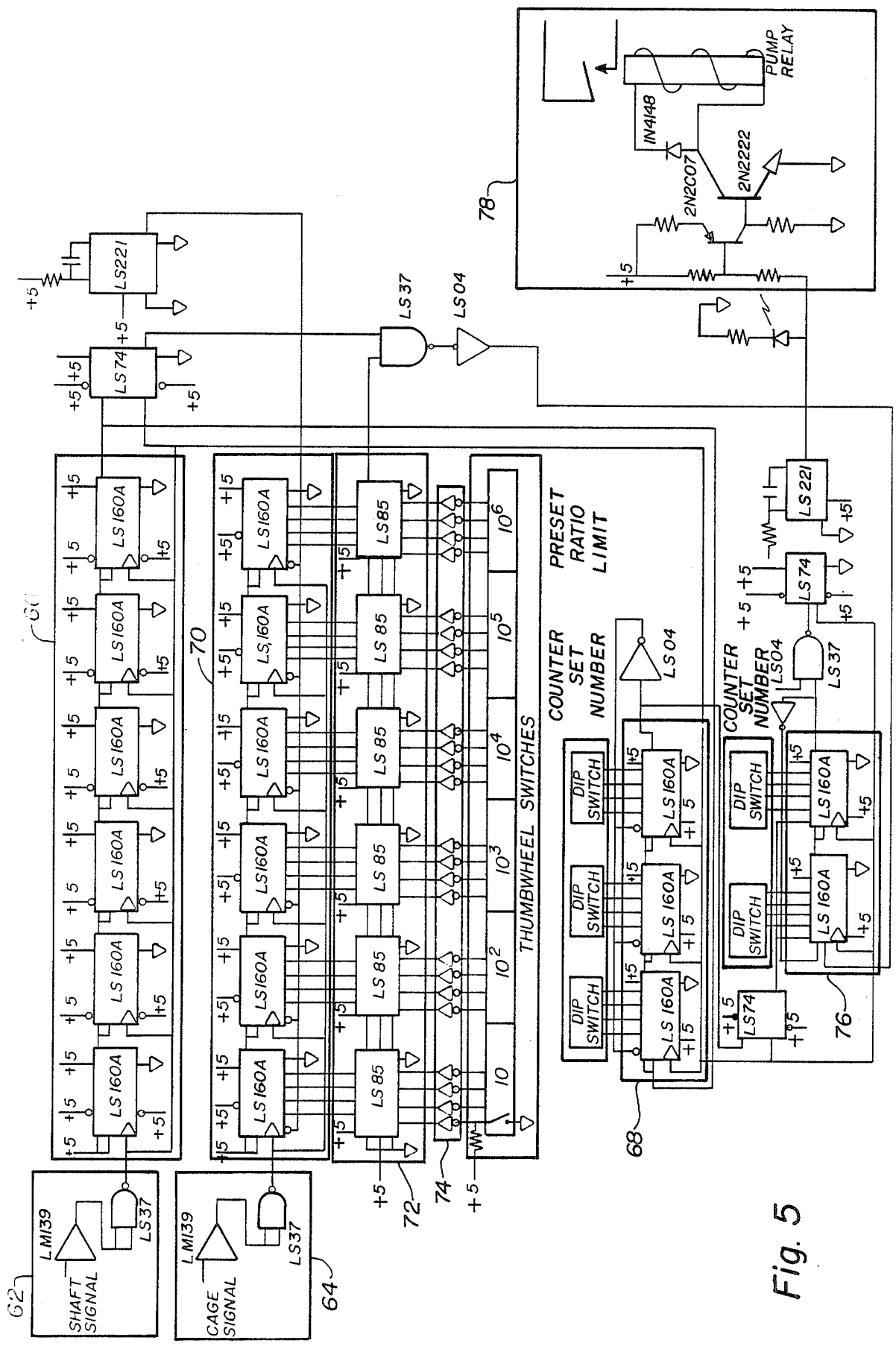
FIG. 5 is a diagrammatic view illustrating an embodiment of a schematic of the control system of FIG. 4.

Referring now to FIG. 4, the fluctuating wave signal from the photo sensor 32 (shown in FIGS. 1, 2, and 3) is input to a control system generally designated 60 where it is processed in accordance with the associated schematic of FIG. 5. A signal from the shaft photosensor 44 is input to a buffer 62 where the signal is converted to a clean square wave. Similarly, a buffer 64 converts the fluctuating wave from the cage photosensor 46 to a clean square wave. The shaft signal from buffer 62 is fed into a counter 66 where the pulses are summed until a specified number is obtained, normally $1 \times 10^6$ pulses. When this specified number of pulses is reached an output pulse is emitted from counter 66. This pulse is transmitted to two other counters 68 and 70. The counter 70 has also been counting pulses from the cage signal buffer 64. The pulse from counter 66 stops counter 70, which then contains the total number of cage pulses counted during the accumulation of $1 \times 10^6$ shaft pulses. This total is input to a comparator 72 and a monitor 74 from counter 70. In the comparator 72, the total number of cage pulses is compared with a preset standart number. If the actual number of cage pulses (or cage/shaft speed ratio) is less than the standard number (preset ratio), the comparator 72 resets and is ready for the next input from counter 70. If the actual number of cage pulses is greater than the standard number, an output pulse is sent to a pump actuation counter 76. If counter 76 accumulates a specified number of pulses, usually 10, from the comparator 72 before being reset, it transmits a pump actuation signal to a relay 78 which in turn controls the pump 52 to provide a desired amount of lubricant. The pump actuation counter 76 receives a periodic reset command from counter 68. When counter 68 has summed input pulses to this predetermined number, it resets itself and sends a signal pulse to reset counter 76.

Figure 6:
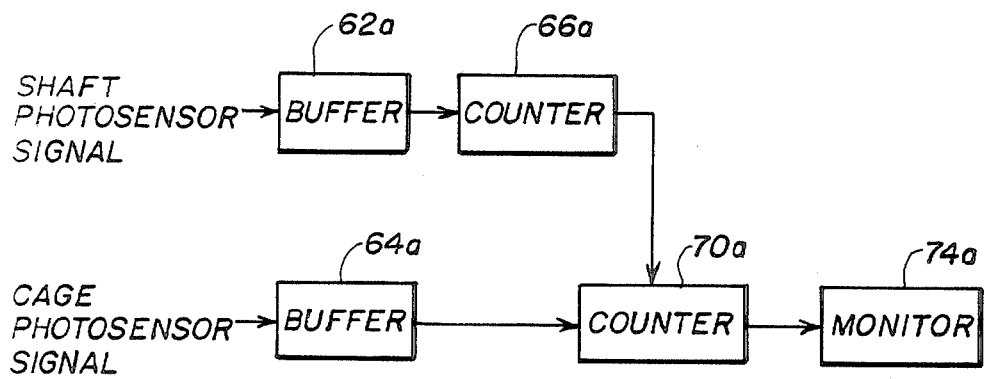
FIG. 6 is a diagrammatic view illustrating another embodiment of a control system used with this invention.

Another possible application for the invention is to monitor the quality of the lubrication in an operating rolling element bearing. For this function, one embodiment of a processing system is shown in block form in FIG. 6. This system worked in exactly the same way as the system depicted in FIG. 4 up to the output of counter 70a. In this case, the output of counter 70a goes only to the monitor 74a, which is either at the site of the bearing being measured or telemetered to a more convenient monitoring location. This application may be particularly useful for a bearing whose lubrication requirements are not well known. The quality of the lubrication (i.e. EHD film) can be monitored, trends noted and a command given to a pump such as 52 only after a decision is made to do so. This system could also allow for the timely shutdown or reconfiguration of a system using a bearing whose performance is expected to degrade based on data from the monitor.

Figure 7:
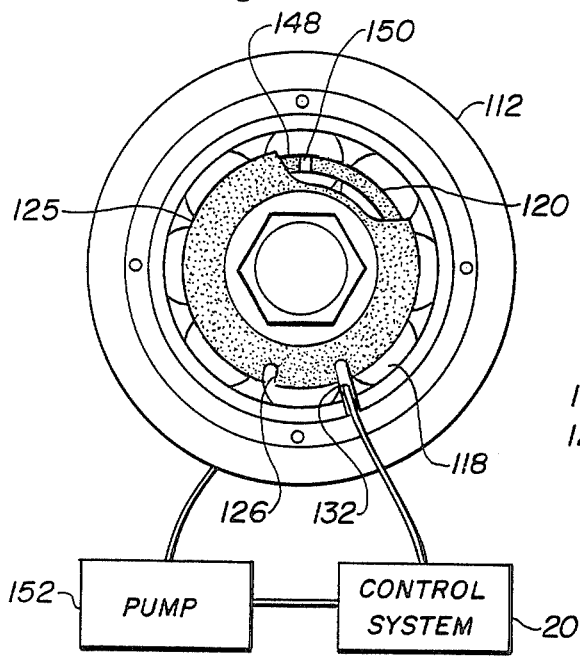
FIG. 7 is a diagrammatic view illustrating another embodiment of the lubrication system of this invention.
Figure 8:
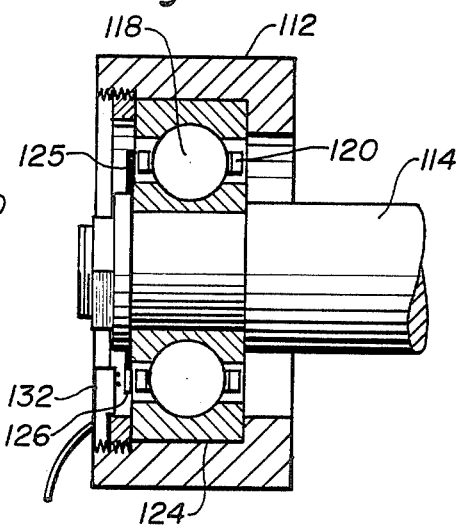
FIG. 8 is a cross-sectional view of the bearing of FIG. 7.
Figure 9:
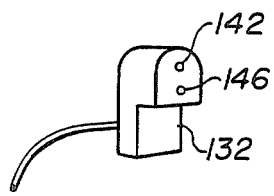
FIG. 9 is a perspective view illustrating an embodiment of another sensor used with this invention.

Another sensor technique is shown in FIGS. 7, 8, and 9. Again for illustration, a sensor 132 is shown but it should be recognized that it is only one of a number of sensors that could be used to achieve the same result. In the illustrated system, a single sensor 132 is mounted on or adjacent to the stationary bearing housing 112. Sensor 132 consists of a photo diode 142 and a photodarlington sensor 146 arranged in such a way that light emitted from the photodiode 142, upon striking a reflective surface on cage 120, will be reflected back to photosensor 146 and produce a pulse that is sent to a control system. A single thin reflective radial line 150 located on an otherwise dark (non-reflective) cage surface 148 would produce a pulse for every revolution of cage 120 if it were not otherwise blocked. A dark disk 125 with a single thin radial slot 126 is attached to the shaft 114 or the inner race of the bearing 124 in such a way that, except when slot 126 is aligned with the sensor 132, it prevents light from reaching cage 120. Therefore, a pulse is only generated when both the reflective line 150 on cage 120 and the slot 126 in the disk 125 are aligned with the sensor 132. The time between pulses will, therefore, be a function of the speed ratio which is, in turn, a function of the EHD film thickness.

Figure 10:
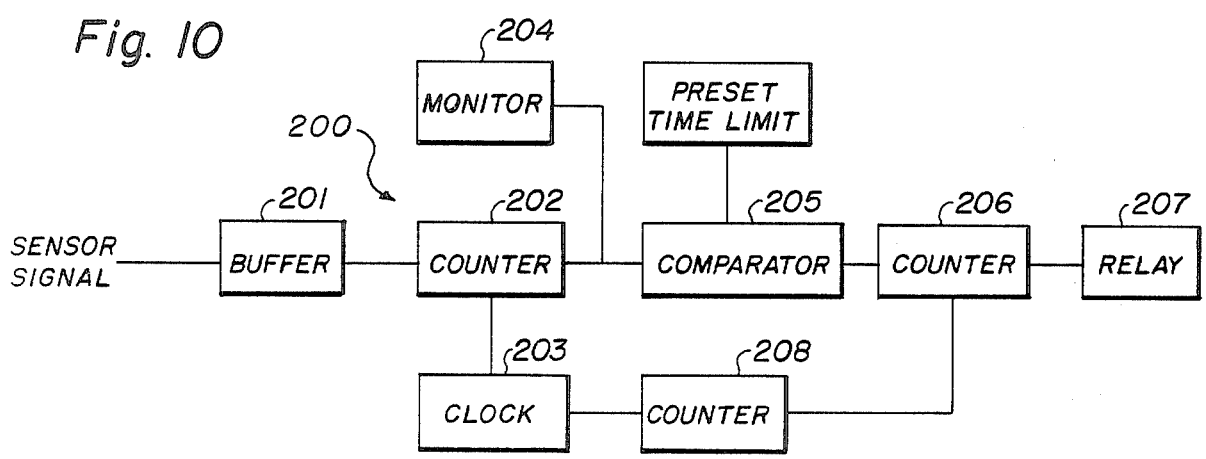
FIG. 10 is a diagrammatic view illustrating an embodiment of a control system used with this invention.

One possible control system for a sensor technique of the type shown in FIG. 7, 8, and 9 is depicted in block diagram form in FIG. 10 and is generally designated 200. In this system, the pulses from the time interval sensor 132 enter a buffer 201 where the shape of the pulse is more sharply defined. From buffer 201 a pulse will start a counter 202 which will count pulses from a clock 203 until another pulse is received from buffer 201, at which time the counter 202 will send the number of clock pulses from clock 203 that is has counted in the interval between signal pulses to a monitor 204 and a comparator 205, Counter 202 has a dual counting capability so that a signal pulse that stops the counting of clock pulses from clock 203 will also start the counting of clock pulses for the next interval. This allows each interval between signal pulses to be measured. The count displayed on the monitr 204 provides a frequently updated display of the quality of the lubrication in the bearing. Comparator 205 compares the number received from the counter 202 with a preset time limit which has been predetermined to correspond to the minimum acceptable EHD film thickness. If the interval measured by counter 202 is less than the preset limit, a pulse is provided to a counter 206. If the interval measured by counter 202 is greater than the preset limit, comparator 205 is reset and no output is made. Counter 206 continues to count pulses from comparator 205 until it reaches a predetermined number or until it is reset. If it reaches its predetermined number (usually 10), it sends an oil-command pulse to a relay 207 which activates an oil pump 152 to provide the desired lubricant. The output of the clock 203 is simultaneously input to a counter 208 which accumulates pulses until a preset number is reached. Therefore, counter 206 is reset periodically. If it counts the predetermined number of pulses from comparator 205 before it is reset, it will deliver a command to pump relay 207, otherwise it will begin counting as soon as it is reset. This system insures that a real, steady state film thickness change has caused the change in time interval from the sensor signal rather than an inadvertent noise pulse or a transient condition that does not require any action or additional lubrication.

While the invention has been described in its preferred embodiments, it is to be understood that the words which have been used are words of description rather than limitation and that changes may be made within the purview of the appended claims without departing from the true scope and spirit of the invention in its broader aspects.

Having thus described the invention, what is claimed is:

1. A controlled replenishing bearing lubrication system comprising:
    rolling element bearing means having relatively rotatable inner and outer races defining a raceway therebetween;
    a plurality of lubricated rolling elements moveable in said raceway in response to relative rotational movement between said inner and outer races;
    rolling element retainer means moveable with said rolling elements;
    sensing means responsive to the relative movement of the retainer means and a rotatable race for providing signals representative of changes in the lubricant film thickness; and
    control means responsive to said signals for maintaining a desired lubricant film thickness.

2. The system of claim 1 wherein said sensing means is responsive to the ratio between the speed of said retainer means and the speed of said rotatable race.

3. The system of claim 1 wherein said sensing means is responsive to the time interval between successive alignments of said inner and outer races and said retainer means for providing signals representative of changes in the lubricant film thickness.

4. The system of claim 1 wherein said control means includes:
    means for providing command signals when the lubricant film thickness varies from a desired thickness; and
    pump means responsive to said command signals for providing a desired amount of lubricant.

5. The system of claim 1 wherein said sensing means includes:
    display means responsive to said signals for providing a display representative of the lubricant film thickness.

6. A controlled replenishing lubrication system comprising:
    a bearing housing;
    rolling elements moveably mounted for rotation with a retainer in the housing, the retainer having a first light reflective indicia moving therewith;
    a shaft rotatably connected to move the retainer and the rolling elements, the shaft having a second light reflective indicia moving therewith;
    sensing means mounted adjacent the housing for emitting light toward said first and second indicia and for sensing variations in reflection of said light; and
    means responsive to said variations for controlling the lubrication supplied to said rolling elements.

7. The system of claim 6 wherein the first light reflective indicia includes a first plurality of reflective stripes.

8. The system of claim 7 wherein the second light reflective indicator includes a second plurality of reflective stripes.

9. The system of claim 8 wherein the means for sensing includes light emitting diodes and photo sensors, one of the diodes directing light at the first plurality of stripes and another of the diodes directing light at the second plurality of stripes, one of the photo sensors sensing shaft speed and another of the photo sensors sensing retainer speed.

10. The system of claim 9, further including:
pump means connected for pumping a lubricant to the bearing housing in response to speed variations between the shaft and the retainer as sensed by the sensing means.

11. The system of claim 10, further including:
control means coupled with the sensing means for controlling the pumping means;
firsr buffer means coupled to said sensing means for receiving pulses responsive to shaft speed and for generating shaft pulses;
second buffer means coupled to said sensing means for receiving pulses responsive to retainer speed and for generating retainer pulses;
first counter means coupled for summing the shaft pulses and, in response to a preset number of shaft pulses being summed, the first counter means generates a counter output pulse;
second and third counter means coupled for receiving the counter output pulse, the third counter means also summing retainer pulses, the third counter means being stopped by the counter output pulse of the first counter means; and
comparator and monitor means coupled for receiving a signal from the third counter means, the comparator means coupled to a pump actuator counter and a pump relay, the comparator means comparing the signal received with a preset standard whereby, when the retainer pulses are less than the preset standard the comparator means is reset and, when the retainer pulses are greater than the preset standard, the comparator means generates a pump output pulse to the pump actuator counter, and when the pump actuator counter accumulates a preset number of pump output pulses, a pump actuation signal is generated to the pump relay.

12. The system of claim 11 wherein the pump actuator counter is coupled to receive reset commands from the second counter.

13. The system of claim 10, further including:
control means coupled with the sensing means for controlling the pumping means;
first buffer means coupled to said sensing means for receiving pulses responsive to shaft speed and for generating shaft pulses;
second buffer means coupled to said sensing means for receiving pulses responsive to retainer speed and for generating retainer pulses;
first counter means coupled for summing shaft pulses and, in response to a preset number of shaft pulses being summed, the first counter means generates a counter output pulse;
second counter means coupled for receiving the counter output pulse, for summing retainer pulses and for generating a second counter output signal; and
monitor means coupled for receiving the second counter output signal.

14. The system of claim 6 wherein the light responsive indicator of the retainer includes a reflective, radially extending stripe.

15. The system of claim 14 wherein the light responsive indicator of the shaft includes a disk having a radially extending slot formed therein.

16. The system of claim 15 wherein the means for sensing includes a light emitting diode and a photo sensor both directed toward the stripe of the retainer and the slot in the disk.

17. The system of claim 16, further including:
pump means connected for pumping a lubricant to the bearing housing in response to speed variations between the shaft and the retainer as sensed by the sensing means.

18. The system of claim 16, further including:
control means coupled with the sensing means for controlling the pumping means;
a buffer coupled for receiving pulses from the sensing means;
a first counter;
a clock, said first counter coupled for receiving pulses from said buffer and said clock;
a comparator;
a monitor, said comparator and said monitor coupled for receiving output signals from said first counter;
a second counter;
a third counter, said second counter coupled for receiving signals from said clock, siad third counter coupled for receiving signals from said comparator and from said second counter; and
a relay coupled for receiving signals from said third counter.

19. A controlled replenishing lubrication system comprising:
a bearing housing;
rolling elements moveably mounted for rotation with a retainer in the housing, the retainer having a first light responsive indicator moving therewith;
a shaft rotatably connected to move the retainer and the rolling elements, the shaft having a second light resonsive indicator moving therewith;
sensing means mounted adjacent the housing for emitting light toward said indicators for sensing variations in reflection of said light and for generating pulses responsive to said variations;
pump means connected for pumping a lubricant to the bearing housing in response to speed variations between the shaft and the retainer as sensed by the sensing means; and
control means coupled with the sensing means and the pump means for controlling the pumping means.

* * * * *